United States Patent [19]

Blevins, II et al.

[11] Patent Number: 4,814,409
[45] Date of Patent: Mar. 21, 1989

[54] POLYSILOXANE-POLYOXYALKYLENE TERPOLYMERS FOR POLYURETHANE FOAM MANUFACTURE

[75] Inventors: Charles H. Blevins, II, Beacon; William B. Herdle, Greenburgh; Gerald J. Murphy, Wappingers Falls, all of N.Y.

[73] Assignee: Union Carbide Corporation, Danbury, Conn.

[21] Appl. No.: 91,114

[22] Filed: Aug. 31, 1987

Related U.S. Application Data

[63] Continuation-in-part of Ser. No. 947,955, Dec. 31, 1986.

[51] Int. Cl.$^4$ .............................................. C08G 77/04
[52] U.S. Cl. ...................................... 528/25; 521/112; 528/29; 556/437; 556/440; 556/445
[58] Field of Search .................. 556/437, 440, 445; 528/25, 29; 521/112

[56] References Cited

U.S. PATENT DOCUMENTS

| | | | |
|---|---|---|---|
| 3,272,762 | 9/1966 | Ibbotson et al. | 556/437 |
| 3,398,104 | 8/1968 | Haluska | 556/437 |
| 3,505,377 | 4/1970 | Morehouse | 260/448.2 |
| 3,532,732 | 10/1970 | Rossmy | 260/2.5 |
| 3,629,308 | 12/1971 | Bailey et al. | 556/437 |
| 3,686,254 | 8/1972 | Morehouse | 556/445 |
| 3,703,489 | 11/1972 | Morehouse | 260/2.5 |
| 3,887,601 | 6/1975 | Kanner et al. | 556/437 |
| 3,980,688 | 9/1976 | Litteral et al. | 556/445 |
| 4,025,456 | 5/1977 | Litteral | 252/2.5 |
| 4,031,044 | 6/1977 | Wallace | 260/2.5 |
| 4,071,483 | 1/1978 | Litteral et al. | 260/2.5 |
| 4,309,508 | 1/1982 | Baskent et al. | 556/445 |
| 4,478,957 | 10/1984 | Klietsch et al. | 521/112 |

FOREIGN PATENT DOCUMENTS 1066142  4/1967  Fed. Rep. of Germany .
3508292  6/1986  Fed. Rep. of Germany ............. 4/

Primary Examiner—Morton Foelak
Attorney, Agent, or Firm—Paul W. Leuzzi

[57] ABSTRACT

A polysiloxane-polyoxyalkylene composition of the nominal formula:

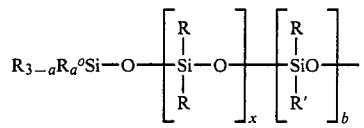

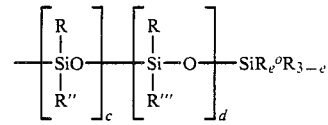

wherein R is an alkyl group having 1 to 3 carbon atoms and R°, R', R" and R'" are individually monovalent polyoxyalkylene polyethers attached to the silicon atom through a difunctional link; and, the polyoxyalkylene of R' is a poly(oxyethylene-oxypropylene) ether which contains 20% to 60% oxyethylene by weight and has an average molecular weight of from about 3,000 to about 5,500;

the polyoxyalkylene of R" is a poly(oxyethylene-oxypropylene) ether which contains 20% to 60% oxyethylene by weight and has an average molecular weight of from about 800 to about 2,900; and the polyoxyalkylene of R'" is a polyoxypropylene polyether having an average molecular weight from about 130 to about 1200;

R° can be R', R" or R'", a and e are individually 0 or 1; b, c, and d are numbers such that $b+c+d=y$, x and y are positive numbers such that the sum of $x+y$ ranges from 25 to 400 and x is greater than y; wherein the ratio $(b+c):d$ ranges from 0.8 to 1.9.

11 Claims, No Drawings

POLYSILOXANE-POLYOXYALKYLENE TERPOLYMERS FOR POLYURETHANE FOAM MANUFACTURE

This is a continuation-in-part of application Ser. No. 947,995, filed Dec. 31, 1986.

BACKGROUND OF THE INVENTION

1. Field of the Invention

This invention provides polysiloxane-polyoxyalkylene terpolymers for the manufacture of conventional flexible polyurethane foam. The invention also provides a process for producing conventional flexible polyurethane foam formulations using these terpolymers as foam stabilizers, including flame retardant foams. The invention further provides conventional flexible polyurethane foam produced using the terpolymers of the invention including flame retardant flexible polyurethane foams.

2. Description of Prior Art

Polysiloxane-polyoxyalkylene copolymers were first disclosed in U.S. Pat. No. 2,834,748 (Bailey et al., 1958). These compositions were of the hydrolyzable type. Non-hydrolyzable polysiloxane-polyoxyalkylene copolymers were first disclosed in U.S. Pat. No. 2,846,458 (Haluska, 1958).

The first use of polysiloxane-polyoxyalkylene copolymers for the stabilization of one-shot flexible polyurethane foam appeared in Brit. Pat. No. 892,136 (Hostettler, 1958). The stabilizers so described were of the hydrolyzable variety. The application of non-hydrolyzable copolymers to the stabilization of polyurethane foams soon followed.

U.S. Pat. No. 4,478,957 discloses the use of certain polysiloxane-polyoxyalkylene block copolymers for the production of highly resilient, cold-curing polyurethane foams. These copolymers as defined are limited to lower molecular weight species (less-than-or-equal-to an average of 25 silicon atoms in the siloxane chain) and contain at least two polyoxyalkylene blocks, which are formed from oxyethylene and oxypropylene units, wherein one such block has a weight percent oxyethylene range of from 38 to 100% (45-100 mole %) and the other such block has an oxyethylene weight percent range of from 0 and 57% (0-50 mole %). The molecular weights of the polyoxyalkylene blocks are both between 150 and 1200 and the molar ratio of one block to another falling in the range of 0.25 to 4.00.

These block copolymer compositions showed improved stabilizing properties and formed open-cell high resilient foams at a relatively wide processing latitude. Those skilled in the art recognize that siloxane surfactants for high resilient (HR) urethane foam provide insufficient stabilization for conventional flexible urethane foam since HR surfactants serve primarily as cell control agents in the inherently more stable high resilient foam formulations.

Additionally, U.S. Pat. No. 4,031,044 discloses the use of polysiloxane-polyoxypropylene copolymers for the stabilization of high resilient polyurethane foams which have low shrinkage and are free of voids without sacrifice of other important physical properties. Again, those skilled in the art realize the inapplicability of HR surfactants in conventional flexible urethane systems.

OBJECTS OF THE INVENTION

It is an object of the invention to produce polysiloxane-polyoxyalkylene compositions for use as stabilizers in the production of polyurethane foam, including flame retardant foams.

Another object of the invention is to provide such compositions which allow the production of an open foam using a wide variety of concentrations of these compositions as stabilizers. This will be referred to as improved breathability latitude.

A further object of the invention is to provide such a stabilizer which can be used to produce flame retardant conventional flexible polyurethane foam.

Other objects will become apparent from the description and examples.

SUMMARY OF THE INVENTION

The present invention provides certain polysiloxane-polyoxyalkylene compositions and their use as stabilizers in the manufacture of polyether polyurethane foam. More particularly, the present invention provides such compositions, which have a polysiloxane chain substituted with at least two types of polyoxyalkylene polymers as pendants from the silicon atoms of the polysiloxane.

The polysiloxane chain is linear or branched and can have average molecular weights of up to 30,000 or higher, excluding the weight of the polyoxyalkylene polymers.

The distinctive feature of these compositions is the specific selection of polyoxyalkylene polymers. Preferably the polyoxyalkylene polymer pendants are provided as at least three different polyoxyalkylene polymers. One of these polyoxyalkylene polymers is composed of only oxypropylene units. This polyoxypropylene has an average molecular weight from about 130 to about 1200 excluding link and endcap. The other polyoxyalkylene polymers are composed of both oxyethylene and oxypropylene units.

The polysiloxane-polyoxyalkylene compositions of the invention are of the nominal formula:

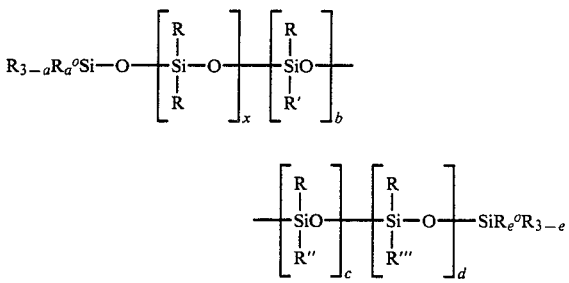

wherein R is an alkyl group having 1 to 3 carbon atoms and R°, R', R" and R'" are individually monovalent polyoxyalkylene polyethers attached to the silicon atom through a difunctional link (e.g., $-(C_2H_4)O-$, $-(C_3H_6)O-$; and the polyoxyalkylene of R' is a poly(oxyethylene-oxypropylene) ether which contains 20% to 60% oxyethylene by weight and has an average molecular weight of from about 3,000 to about 5,000;

the polyoxyalkylene of R" is a poly(oxyethylene-oxypropylene) ether which contains 20% to 60% oxyethylene by weight and has an average molecular weight of from about 800 to about 2,900; and the polyoxyalkylene of R''' is a polyoxypropylene polyether having an average molecular weight from about 130 to about 1200; R° can be R', R'' or R'''; a and e are individually 0 or 1; b, c and d are numbers such that $b+c+d=y$ and where b or c may be zero, but not both; x and y are positive numbers such that the sum of $x+y$ ranges from 25 to 400 and x is greater than y, wherein the ratio $(b+c):d$ ranges from 0.8 to 1.9.

DETAILED DESCRIPTION OF THE INVENTION

In accordance with the objects of the invention the present invention provides a polysiloxane-polyoxyalkylene composition comprising polysiloxane and specific organic blocks as described below.

The end groups of the polysiloxane are silicon atoms with three organic substituents $[(R_{3-a}R°_a—Si—$ and $—SiR°_eR_{3-e})]$ as shown above. The silicon atom of the end group is attached to the terminal oxygen atom of the polysiloxane chain.

As stated above, R is an alkyl group having from 1 to 3 carbon atoms. R° can be any of the polyoxyalkylene polyethers attached to the silicon atom through a difunctional link, which are designated R', R'', R''', and are described in more detail below. In the above formula, a and e are individually 0 or 1.

As can be seen from the general formula, the compositions of the present invention are made up of four general difunctional siloxy units having organic substituents. The first unit contains only R as its substituents and this unit is present in an amount "x." The other three units, which contain polyoxyalkylene ethers are present in amounts "b", "c" and "d", respectively. The sum of $b+c+d=y$, the total number of polyoxyalkylene containing siloxy units in the polymer. The number x is greater than y and the sum of $x+y$ ranges from 25 to 400.

The numerical ratio x:y can vary over a broad range. Generally this range is from about 3:1 to about 15:1. If the terpolymer is to be used as a surfactant in a flame retardant formulation it is preferred that the ratio of x:y be less than about 10:1.

Polyoxyalkylene Polyethers

The compositions of the invention contain poly(oxyethylene-oxypropylene) ether and poly(oxypropylene) ether as pendants from the polysiloxane.

Preferably, the terminal group of the polyoxyalkylene polyethers is any alkoxy group having 1 to 4 carbon atoms or an acyloxy group of a lower aliphatic carboxylic acid. The preferred terminal group of the polyoxyalkylene polyethers is an acetoxy group.

These polyethers are attached to silicon atoms in the polysiloxane through a difunctional link. The difunctional link is of the formula $—C_nH_{2n})O—$ wherein n is a number from 0 to 6. Usually n is a number from 0 to 4. Preferably n is 3 or 4.

Poly(Oxyethylene-Oxypropylene) Polyethers

The poly(oxyethylene-oxypropylene) polyethers contain from 20% to 60% oxyethylene by weight, with the balance of the weight, excluding the link and terminal groups, made up of oxypropylene. Preferably the poly(oxyethylene-oxypropylene) polyether is 40% oxyethylene by weight.

It is preferred that the composition contain two poly(oxyethylene-oxypropylene) ether components of different average molecular weights.

The average molecular weight of the first, or higher molecular weight, poly(oxyethylene-oxypropylene) component (R') is generally from about 3,000 to about 5,500. The average molecular weight of the second, or lower molecular weight poly(oxyethylene-oxypropylene) component (R'') is generally from about 800 to about 2,900.

The higher molecular weight poly(oxyethylene-oxypropylene) component, R', can be provided as (i) a poloxyalkylene copolymer having an average molecular weight in the range of from about 3000 to about 5500 wherein about 20 to about 60 weight percent of the oxyalkylene groups of said copolymer are oxyethylene, the remainder of the oxyalkylene groups being oxypropylene, or (ii) a blend of at least two polyoxyalkylene copolymers having different average molecular weights in the range of from about 3000 to about 5500 and wherein about 20 to 60 weight percent of the oxyalkylene groups of the copolymers in said blend are oxyethylene, the remainder of the oxyalkylene groups being oxypropylene, with the proviso that said blend has an average molecular weight in the range of from about 3000 to about 5500.

Similarly, the lower molecular weight poly(oxyethylene-oxypropylene), R'', can be provided as (i) a polyoxyalkylene copolymer having an average molecular weight in the range of from about 800 to about 2900 wherein about 20 to about 60 weight percent of the oxyalkylene groups of said copolymer are oxyethylene, the remainder of the oxyalkylene groups being oxypropylene, or (ii) a blend of at least two polyoxyalkylene copolymers having different average molecular weights in the range of from about 500 to about 2900 and wherein about 20 to about 60 weight percent of the oxyalkylene groups of the copolymers in said blend are oxyethylene, the remainder of the oxyalkylene groups being oxypropylene, with the proviso that said blend has an average molecular weight in the range of from about 800 to 2900.

The higher molecular weight polyether component, R', is present in an amount designated as "b". The lower molecular weight polyether component, R'', is present in an amount designated as "c". The proportions of R' and R'' are generally such that $b/b+c=$ from 1 to 0, The two polyether components are preferably used in proportions such that the blend average molecular weight of the two poly(oxyethylene-oxypropylene) polyethers is from about 2,400 to about 3,400.

About 20 to 60 weight percent of the oxyalkylene groups of the polyoxyalkylene copolymers (be they low or high molecular weight polyoxyalkylene polyethers) must be oxyethylene, the remainder of the oxyalkylene groups of said copolymers being oxypropylene. Of course, it is to be understood that the oxyethylene and oxypropylene groups of said copolymers may be present in the polyoxyalkylene block in a random or block fashion. The expression poly(oxyethylene-oxypropylene) copolymers as employed herein is used to represent copolymers in which oxyalkylene groups are present in random distribution (and indeed such is preferred) as well as copolymers in which the oxyalkylene groups are present as blocks. Therefore, in no way should the expression poly(oxyalkylene-oxypropylene) copolymer be interpreted as merely encompassing copolymers in which oxyalkylene groups are present in blocks, i.e., a block of oxyethylene and a block of oxypropylene. Of course, it is to be also understood that the term propylene oxide employed herein refers to 1,2-propylene oxide and the oxypropylene radical derived therefrom.

Polyoxypropylene Polyether

The third polyoxyalkylene polyether, R''', is a polyoxypropylene polyether.

The molecular weight of the polyoxypropylene polyether, R''' is generally greater than about 130. Usually the molecular weight of the polyoxypropylene is from about 130 to about 1200. The preferred molecular weight range for the polyoxypropylene is from about 200 to about 1,000. As with the other polyoxyalkylene components the polyoxypropylene may also be provided as a blend of at least two polyoxypropylene polyethers to provide a blend having an average molecular weight in the stated ranges.

Some of the polyoxypropylene polyether can be left uncapped; that is the terminal group is hydroxyl attached to the terminal carbon atom.

The polyoxypropylene R''' is present in an amount "d". The molar ratio of poly(oxyethylene-oxypropylene) pendants to poly(oxypropylene) pendants expressed as (b+c):d will generally range from about 0.8:1 to about 1.9:1.

Method of Preparation

The polyoxyalkylene polyether components are well known in the art and/or can be produced by any conventional process. For instance, monohydroxy terminated polyoxyalkylene polyethers which are convenient starting materials in the preparation of the terpolymer can be prepared by reacting a suitable alcohol with ethylene oxide and propylene oxide (1,2-propylene oxide) to produce the copolymer polyether, or with propylene oxide alone to produce the polyoxypropylene ether. Suitable alcohols are alkanols, e.g., methanol, ethanol, propanol, isopropanol, butanol, tertiary butanol, and the like; hydroxy aryl compounds, e.g. phenol, and the like; hydroxy aralkyl compounds, e.g., 2-phenyl ethanol, and the like; and hydroxy alkenyl compounds, e.g., allyl alcohol, methallyl alcohol and the like. In general the alcohol starter preferably is placed in an autoclave or other high-pressure vessel along with catalytic amounts of a suitable catalyst, such as sodium hydroxide, potassium hydroxide, other alkali metal hydroxides, or sodium or other alkali metals. Further details of preparation are set forth for example in U.S. Pat. No. 3,980,688.

The above-described alcohol-oxide reaction produces a monohydroxy end-blocked polyoxyalkylene polyethers in which the other end-blocking group is an alkoxy, aryloxy, aralkyloxy, or alkenyloxy radical.

These polyethers can be converted to monoalkenyloxy terminated polyoxyalkylene polyethers by converting (capping) the hydroxyl terminal group of said monohydroxy endblocked poly(oxyethyleneoxypropylene) copolymers by any conventional means. For example, when the monohydroxy terminated polyether is started with an alkanol, hydroxy aryl or hydroxy aralkyl compound the copolymer can be reacted with an alkali metal alkoxide preferably sodium methoxide to produce the alkali metal alkoxide of the polyether which is then reacted with an alkenyl halide, preferably a chloride and especially allyl chloride or methallyl chloride, to give the desired monoalkenyloxy endblocked polyoxyalkylene polyether in which the other end-blocking group is alkoxy, aryloxy, or aralkyloxy radical. Alternatively, when the monohydroxy terminated polyether is started with an hydroxy alkenyl compound, the hydroxyl terminal group of the copolymer can be capped in the same manner using alkyl, aryl or aralkyl halides (preferably chlorides) or by esterifying said hydroxy terminal group with an acyl (preferably acetic anhydride) compound to give the desired monoalkenyloxy endblocked polyethers in which the other endblocking group is an alkoxy, aryloxy, aralkyoxy or acyloxy radical.

The method of producing the novel polysiloxane-polyoxyalkylene block terpolymers of this invention can be conducted in the same manner as any conventional known method for producing polysiloxane-polyoxyalkylene block copolymers such as described, e.g., in U.S. Pat. Nos. 2,834,748, 2,920,1150 and 3,801,616. Such conventional methods have been described above. Production of the non-hydrolyzable compositions involve the common chemical reactions of reacting, for instance, a monoalkenyloxy endblocked polyoxyalkylene polyether with a polysiloxane containing silanic hydrogen at elevated temperatures, e.g., from about 60° C. to about 140° C. in the presence of a catalyst such as platinum catalysts (e.g., chloroplatinic acid), and the like, and optionally in the presence of a solvent (e.g., liquid hydrocarbons, such as toluene or isopropyl alcohol and the like) for the polyoxyalkylene polyether and polysiloxane reactants. The usual conventional amounts of components and reaction conditions can be employed and such is well within the knowledge of one skilled in the art. For instance, approximately stoichiometric amounts of slightly higher of the polyoxyalkylene polyether and the functional containing polysiloxane reactants are preferred, while the amount of catalyst need obviously only be a catalytic amount. The temperature of the reaction, of course, largely depends merely on the reactants involved and the polysiloxane-polyoxyalkylene block terpolymer desired to be produced.

Production of the hydrolyzable compositions involve the common chemical reactions of reacting monohydroxyl terminated polyoxyalkylene polyether with a polysiloxane containing, for instance, alkoxy radical(s), amino radical(s) or halogen atom(s) directly attached to a silicon atom(s) of the polysiloxane at elevated temperatures, e.g. from about 60° C. to about 140° C. in the presence of a catalyst such as Influoro acetic acid, and the like, and optionally in the presence of a solvent (e.g., liquid hydrocarbons such as toluene and the like) for the polyoxyalkylene polyether and polysiloxane reactants.

The usual conventional amounts of components and reaction conditions can be employed and such is well within the knowledge of one skilled in the art. For instance, approximately stoichiometric amounts of slightly higher of the polyoxyalkylene polyether and the functional containing polysiloxane reactants are preferred, while the amount of catalyst need obviously only be a catalytic amount. The temperature of the reaction, of course, largely depends merely on the reactants involved and the polysiloxane-polyoxyalkylene block composition desired to be produced.

Of course, it is to be understood that the polysiloxane-polyoxyalkylene block copolymers of this invention can contain small amounts of other siloxy units, e.g., SiH groups (owing to incomplete reaction thereof with the polyoxyalkylene reactant) and/or Si-alkoxy or Si—OH groups owing to the incomplete hydrolysis and condensation of the silanes used to produce the siloxane reactant.

Preparation of Conventional Flexible Polyurethane Foam

In addition to the novel polysiloxane polyoxyalkylene compositions of the present invention, the other essential types of components and reactants employed in providing flexible polyether polyurethane foams as described herein are polyether polyols, organic polyisocyanates, a catalyst system and blowing agent.

In producing the flexible polyether polyurethane foams of the present invention, one or more polyether polyols is employed for reaction with the polyisocyanate reactant to provide the urethane linkage. Such polyols have an average of at least two, and usually not more than six, hydroxyl groups per molecule and include compounds which consist of carbon, hydrogen and oxygen and compounds which also contain phosphorus, halogen and/or nitrogen.

Such polyether polyols are well known in the art and include, for example, polyethers exemplified by the following classes of composition:

a. Polyoxyalkylene polyols including alkylene oxide adducts of, for example, water; hexylene glycol; glycerol; 1,2,6-hexanetriol; 1,1,1-trimethylolpropane; pentaerythritol; sorbitol; triethanolamine; and the like. The alkylene oxides employed in producing the polyoxyalkylene polyols normally have 2 to 4 carbon atoms. Propylene oxide and mixtures of propylene oxide with ethylene oxide are preferred.

b. Polymer/polyether polyols which are produced by polymerizing one or more ethylenically unsaturated monomers dissolved or dispersed in a polyether polyol in the presence of a free radical catalyst. Suitable polyether polyols for producing such compositions include, for example, any of the above described polyols encompassed by paragraph (a) above. Illustrative of suitable ethylenically unsaturated monomers are those encompassed by the general formula

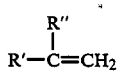

where: R' is hydrogen, methyl or chlorine, and R" is cyano, phenyl or methyl-substituted phenyl groups. Typical examples of such polymerizable monomers are the following which may be employed individually or in combination; acrylonitrile, methacrylonitrile, vinyl chloride, vinylidene chloride, styrene and alpha-methylstyrene. These and other polymer/polyol compositions which are suitably employed either individually or in combination with polyethers mentioned in paragraph (a) above are described in British Pat. No. 1,063,222 and U.S. Pat. No. 3,383,351. Such compositions are prepared by polymerizing the monomers in the polyol at a temperature between about 40° C. and about 150° C. employing any free radical-generating initiator including peroxides, and azo-bis-(isobutyronitrile). The polymer/polyether polyol product may also contain a small amount of unreacted polyether, monomer and free polymer.

In preparing the flexible polyether polyurethane foams in accordance with the present invention it is, of course, to be understood that any of the aforesaid polyether polyols or mixtures thereof can be employed as reactants with the organic polyisocyanate. The particular polyether polyol or polyols employed merely depends upon the desired end-use of the polyurethane foam. Usually diols and triols provide soft foams, firmer foams are obtained by the incoporation of polyether polyols having three or more hydroxyl groups, including triols, tetra-ols, pentols and hexols. When it is desired to produce polyurethanes having comparatively high load-bearing properties and/or die-cutability, polymer/polyether polyols of the aforesaid type are used.

The hydroxyl number of the polyether polyol reactant including mixtures of polyols employed in the production of the flexible polyurethane foams of this invention may vary over a relatively wide range such as from about 20 to about 150, and is usually no higher than about 80. As is well known in this art, the hydroxyl numbers are determined by, and are defined as, the number of milligrams of potassium hydroxide required for the complete neutralization of the hydrolysis product of the fully acetylated derivative prepared from 1 gram of polyol or mixture of polyols. The hydroxyl number is also defined by the following equation which indicates its relationship with the molecular weight and functionality of the polyol:

$$OH = \frac{56.1 \times 1000 \times f}{M.W.}$$

wherein

OH=hydroxyl number of the polyol, f=average functionality, that is, the average number of hydroxyl groups per molecule of polyol and M.W.=average molecular weight of the polyol.

The organic polyisocyanates that are useful in producing flexible polyether polyurethane foam in accordance with the process of this invention are well known in the art and are organic compounds that contain at least two isocyanato groups and any such compounds or mixtures thereof may be employed. Among such suitable polyisocyanates are those conveniently represented by the general formula:

[D(NCO)]$_i$ wherein i is an integer of two or more and D is an organic radical having the valence of i. D can be a substituted or unsubstituted hydrocarbon group (e.g., alkylene, arylene, aralkylene and the like).

Illustrative of suitable organic polyisocyanate reactants are the following including mixtures thereof: 1,6-diisocyanato-hexane; 1,4-phenylene-diisocyanate; 2,4-tolylene-diisocyanate; 2,6-tolylene-diisocyanate; crude tolylene diisocyanates; xylylene diisocyanates; diphenylmethane-4,4'-diisocyanate; and many other organic polyisocyanates that are known in the art such as those disclosed in an article by Siefken, Ann. 565,75 (1949). In general, the aromatically unsaturated polyisocyanates are preferred.

Also, included as useful in the preparation of the conventional flexible polyether polyurethane foams in accordance with the process of this invention are the polyisocyanates of the aniline-formaldehyde polyaromatic type which are produced by phosgenation of the polyamine obtained by acid-catalyzed condensation of aniline with formaldehyde. Poly(phenylmethylene) polyisocyanates of this type are available commercially under such trade names as PAPI and, Mondur MR. These products are low viscosity (50-500 centipoise at 25° C.) liquids having average isocyanato functionalities in the range of about 2.25 to about 3.2 or higher, depending upon the specific aniline-to-formaldehyde molar ratio used in the polyamine preparation.

Other useful polyisocyanates are combinations of diisocyanates with polymeric isocyanates containing more than two isocyanato groups per molecule. Illustrative of such combinations are: a mixture of 2,4-tolylene diisocyanate, 2,6-tolylene diisocyanate and the aforesaid poly(phenylmethylene) polyisocyanates; and a mixture of isomeric tolylene diisocyanates with polymeric tolyene diisocyanates obtained as residues from the manufacture of the diisocyanates.

On a combined basis, the polyether polyol and organic polyisocyanate reactants usually constitute the major proportion by weight of the polyurethane-forming reaction mixture. In general, the polyisocyanate and polyether polyol reactants are employed in relative amounts such that the ratio of total-NCO equivalents to total active hydrogen equivalent (of the polyether polyol and any water, when used) is from 0.8 to 1.5, preferably from 0.9 to 1.2, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from 80 to 150, and is preferably within the range from about 90 to 120.

The urethane-forming reaction is effected in the presence of a minor amount of a catalyst, preferably an amine catalyst and usually a tertiary amine. Suitable amine catalysts include one or more of the following: N-ethylmorpholine; N,N,N',N'-tetramethyl-1,3-butanediamine; N,N-dimethylethanolamine; hexadecyldimethylamine; N,N-dimethylbenzylamine; bis(2-dimethylaminoethyl)ether; triethylenediamine (i.e., 1,4-diazabicyclo[2.2.2]octane); the formate and other carboxylic acid salts of triethylenediamine, and bis(2-dimethylaminoethyl)ether; and the like. The amine catalyst may be introduced to the polyurethane producing reaction mixture as such or as a solution in suitable carrier solvents such as dipropylene glycol, preferably the amine catalyst is generally present in the final urethane-producing reaction mixture in an amount of from about 0.05 to about 3 parts by weight of active catalyst (that is, the amine exclusive of other components present in solutions thereof) per 100 parts by weight of the polyether polyol reactant (referred to by using the phrase pphp).

It is also preferred to include a minor amount of certain metal catalysts in addition to the amine catalyst in the reaction mixture for production of the polyurethane foam. Such supplementary catalysts are well known to the art of conventional flexible polyether-based polyurethane foam manufacture. For example, useful metal catalysts include organic derivatives of tin, particularly tin compounds of carboxylic acids such as stannous octoate, dibutyl tin dilaurate, and other such tin salts. In general, the amount of such metal cocatalysts which can be present in the polyurethane producing reaction mixture is within the range from about 0.05 to about 0.5 parts by weight per 100 parts by weight of the polyether polyol reactant (pphp).

Foaming is accomplished by employing a small amount of a polyurethane blowing agent such as water in the reaction mixture (e.g., about 0.5 to about 7 weight percent of water, based on the total weight of the reaction mixture) which upon reaction with isocyanate generates carbon dioxide in situ, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80° F., and above −60° F., or other inert gases such as nitrogen and carbon dioxide. Suitable liquefied gases include aliphatic and cycloaliphatic fluorocarbons which vaporize at or below the temperature of the foaming mass. Such gases are at least partially fluorinated and may also be otherwise halogenated. Fluorocarbon blowing agents suitable for use in foaming the formulations of this invention include trichloromonofluoromethane, dichlorodifluoromethane, 1,1-dichloro-1-fluoroethane, and the like. Another useful class of blowing agents include thermally-unstable compounds which liberate gases upon heating, such as N,N'-dimethyl-N,N'-dinitrosoterephthalamide, and the like. The generally preferred method for producing flexible foams is the use of water or a combination of water plus a fluorocarbon blowing agent such as trichloromonofluoromethane. The amount of blowing agent employed in the foaming reaction will vary with factors such as the density that is desired in the foamed product. Usually, however, from about 1 to about 30 parts by weight of the blowing agent per 100 parts by weight of the polyether polyol reactant is preferred.

The polyether-based polyurethane foams of this invention may be formed in accordance with any of the processing techniques known to the art such as, in particular, the "one-shot" technique. In accordance with this method, foamed products are provided by carrying out the reaction of the polyisocyanate and polyether polyol simultaneously with the foaming operation. It is sometimes convenient to add the polysiloxane-polyoxyalkylene block terpolymer foam stabilizer to the reaction mixture as a premixture with one or more of the blowing agent, polyether polyol, and catalyst components. Typically the amount of polysiloxane-polyoxyalkylene terpolymer is from about 0.1 to about 5.0 parts by weight per 100 parts by weight of the polyether polyol (pphp). Preferably the amount of terpolymer is from about 0.45 to about 3.0 pphp, and most preferably from about 0.75 to about 2.0 pphp.

It is to be understood that the relative amounts of the various components of the foam formulations are not narrowly critical. The polyether polyol and polyisocyanates are present in the foam-producing formulation in a major amount. The relative amount of these two components is the amount required to produce the desired urethane structure of the foam and such relative amounts are well known in the art. The blowing agent, catalyst and polysiloxane-polyoxyalkylene block terpolymer foam stabilizer are each present in a minor amount necessary to achieve the function of the component. Thus the blowing agent is present in an amount sufficient to foam the reaction mixture, the catalyst is present in a catalytic amount (i.e., an amount sufficient to catalyze the reaction to produce the urethane at a reasonable rate), and the polysiloxane-polyoxyalkylene block copolymers of this invention are present in a foam stabilizing amount, that is, in an amount sufficient to stabilize the foam. The preferred amounts of these various components are as given hereinabove.

If desired other additional ingredients can be employed in minor amounts in producing the polyurethane foams in accordance with the process of this invention. Illustrative of such additives that can be employed are: cross-linking agents such as glycerol, triethanolamine and their oxyalkylene adducts, as well as fillers, dyes, pigments, anti-yellowing agents and the like. Flame retardant agents can also be employed if desired. Such flame retardants are well known in the art and include a variety of compounds which preferably contain phosphorus or halogen or both phosphorus and halogen. Illustrative of such flame retardant agents include those disclosed in U.S. application Ser. No. 279,883 filed Aug. 11, 1972, now U.S. Pat. No. 3,846,462 and U.S. Pat. Nos. 3,075,927; 3,075,928; 3,222,305; and 3,574,149.

The polyurethanes produced in accordance with the present invention can be used in the same areas as other conventional flexible polyether polyurethanes. For example, the foams of the present invention can be used with advantage in the manufacture of cushions, mattresses, paddings, carpet underlay, packaging, gaskets, and the like.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLES

In the following examples the formula MDD'M is used to describe the polyhydridosiloxane polymer reactant. It is to be understood that $M=(CH_3)_3SiO_{1/2}$, $D=(CH_3)_2SiO_{2/2}$ and $D'=CH_3Si(H)O_{2/2}$. In the following examples, R', R" and R''' are used to indicate starting materials which correspond to the pendant so designated in the claimed structure. The term terpolymer is used herein to denote the final composition comprising polysiloxane, poly(oxyethylene-oxypropylene) and polyoxypropylene.

EXAMPLE 1

In a 250 mL three necked flask fitted with a heating mantle, mechanical stirrer, thermometer, Dean-Stark trap, Friedrich condenser and nitrogen sparge tube were combined 25.77 grams of an allyl started, acetoxy endcapped polyoxyalkylene polymer (R") with an average molecular weight of about 1638 and containing about 40 weight percent oxyethylene groups and about 60 weight percent oxypropylene groups (designated herein as Polyether A), 49.33 grams of an allyl started, acetoxy endcapped polyoxyalkylene polymer (R') with an average molecular weight of about 4301 and containing about 40 weight percent oxyethylene groups and about 60 weight percent oxypropylene groups (designated herein as Polyether B), 3.89 grams of an allyl started, acetoxy endcapped polyoxypropylene ether (R''') with an average molecular weight of about 233 (designated herein as Polyether C) and 42.82 grams of toluene. Then, 21.10 grams of a polyhydridosiloxane polymer having the average formula $MD_{76}D'_9M$ (Calculated: 31.82 ccH$_2$/gram; Analyzed: 31.4 ccH$_2$/gram) was added to the pot. This mixture was heated to 85° C. and 0.36 mL of an H$_2$PtCl$_6$/ethanol solution (10 mg Pt/mL) was added, corresponding to 25 ppm Pt. After holding the pot contents at 85° C. for one hour, 1 wt.% NaHCO$_3$ was added followed by a nitrogen sparge assisted solvent strip. After completion of the strip, the pot contents were pressure filtered and the product collected. This product, designated herein as Surfactant 1, was a clear, amber colored liquid.

EXAMPLES 2–5

Following the procedure of Example 1, the following siloxane-polyether terpolymers were prepared.

TABLE I

| Surf. | Polyhydridosiloxane | R" Polyether A | R' Polyether B | R''' Polyether C |
|---|---|---|---|---|
| 2 | MD$_{76}$D'$_9$M - 22.25 g | 27.87 g | 45.57 9 | 4.34 g |
| 3 | MD$_{76}$D'$_9$M - 23.56 g | 30.04 g | 41.57 g | 4.87 g |
| 4 | MD$_{76}$D'$_9$M - 22.46 g | 30.81 g | 42.62 g | 4.14 g |
| 5 | MD$_{76}$D'$_9$M - 22.16 g | 25.12 g | 48.18 g | 4.58 g |

These preparations cover a range of 2500 to 2700 for the average molecular weight of Polyethers A and B and a molar ratio range of Polyethers A and B to Polyether C of 1.45–1.75.

EXAMPLES 6–9

Following the procedure of Example 1, the following siloxane-polyether terpolymers were prepared.

TABLE II

| Surf. | Polyhydridosiloxane | R" Polyether A | R' Polyether B | R''' Polyether D |
|---|---|---|---|---|
| 6 | MD$_{76}$D'$_9$M - 21.17 g | 24.33 g | 46.66 g | 7.88 g |
| 7 | MD$_{76}$D'$_9$M - 20.85 g | 24.58 g | 47.14 g | 7.47 g |
| 8 | MD$_{76}$D'$_9$M - 19.49 g | 18.20 g | 55.09 g | 7.26 g |
| 9 | MD$_{76}$D'$_9$M - 19.18 g | 18.38 g | 55.62 g | 6.87 g |

Polyether D is an allyl started, acetoxy endcapped polyoxypropylene ether (R''') with an average molecular weight of about 424.

The above prepared terpolymers covered an average molecular weight range of 2700 to 3000 for Polyethers A and B and a molar ratio of Polyethers A and B to Polyether D of 1.5 to 1.6.

EXAMPLES 10–13

Following the procedure in Example 1, the following siloxane-polyether terpolymers were prepared.

TABLE III

| Surf. | Polyhydridosiloxane | R" Polyether A | R' Polyether E | R''' Polyether F |
|---|---|---|---|---|
| 10 | MD$_{76}$D'$_9$M - 19.27 g | 25.84 g | 45.74 g | 9.14 g |
| 11 | MD$_{76}$D'$_9$M - 19.74 g | 25.34 g | 44.85 g | 10.08 g |
| 12 | MD$_{76}$D'$_9$M - 17.23 g | 18.60 g | 56.00 g | 8.17 g |
| 13 | MD$_{76}$D'$_9$M - 17.68 g | 18.27 g | 55.02 g | 9.03 g |

Polyether E is an allyl started, acetoxy endcapped polyoxyalkylene polymer (R') with an average molecular weight of about 3989 and containing about 40 weight percent oxyethylene groups and about 60 weight percent oxypropylene groups.

Polyether F is an allyl started, acetoxy endcapped polyoxypropylene ether (R''') with an average molecular weight of about 590.

The terpolymers described in Table III cover a molecular weight range for polyethers A and E of 2450–2750 and a molar ratio of Polyethers A and E to Polyether F of 1.6–1.8.

EXAMPLES 14–18

Following the procedures outlined in Example 1, the following siloxane-polyether terpolymers were prepared.

TABLE IV

| Surf. | Polyhydridosiloxane | R″ Polyether A | R′ Polyether E | R‴ Polyether F |
|---|---|---|---|---|
| 14 | $MD_{76}D'_9M$ - 20.96 g | 29.52 g | 38.82 g | 10.71 g |
| 15 | $MD_{76}D'_9M$ - 22.34 g | 34.26 g | 31.99 g | 11.41 g |
| 16 | $MD_{76}D'_9M$ - 20.31 g | 24.71 g | 43.74 g | 11.24 g |
| 17 | $MD_{76}D'_9M$ - 18.24 g | 17.87 g | 53.80 g | 10.10 g |
| 18 | $MD_{76}D'_9M$ - 18.65 g | 21.61 g | 50.21 g | 9.53 9 |

Terpolymers 14 and 15 represent compositions where the molar ratio of Polyethers A and E to Polyether F is held at 1.6 and the average molecular weight of Polyethers A and E are 2300 and 2150, respectively.

Terpolymers 16–18 represent compositions where the molar ratio of Polyethers A and E to Polyether F is held at 1.4 and the average molecular weight of Polyethers A and E are 2450 and 2750, respectively.

EXAMPLES 19–23

The following terpolymers were prepared following the procedures outlined in Example 1.

TABLE V

| Surf. | Polyhydridosiloxane | R″ Polyether G | R′ Polyether H | R‴ Polyether I |
|---|---|---|---|---|
| 19 | $MD_{76}D'_9M$ - 22.3 g | 29.2 g | 44.4 g | a |
| 20 | $MD_{76}D'_9M$ - 22.4 g | 29.3 g | 44.6 g | b |
| 21 | $MD_{76}D'_9M$ - 22.3 g | 28.4 g | 46.3 g | c |
| 22 | $MD_{76}D'_9M$ - 22.4 g | 29.2 g | 44.4 g | d |
| 23 | $MD_{76}D'_9M$ - 21.0 g | 24.4 g | 50.8 g | e |

Polyether G is an allyl started, acetoxy endcapped polyoxyalkylene polymer with an average molecular weight of about 1638 and containing about 40 weight percent oxyethylene groups and about 60 weight percent oxypropylene groups (R″).

Polyether H is an allyl started, acetoxy endcapped polyoxyalkylene polymer with an average molecular weight of about 3989 and containing about 40 weight percent oxyethylene groups and about 60 weight percent oxypropylene groups (R′).

Terpolymers 19–21 represent compositions where the molar ratio of Polyethers G and H to Polyether I(a-c) is held at 1.75, the blend average molecular weight of Polyethers G and H are held at 2500. Both Polyether G and H have 40% by weight oxyethylene units. Polyethers I(a-c) represent R‴ and are based upon the same allyl started polypropylene oxide polymer with a molecular weight of 191 and differ only in the degree of acetoxy capping where Ia is 98.3% capped, Ib is 54% capped and Ic is completely hydroxyl terminated.

Terpolymer 22 represents a composition of blend average molecular weight of Polyethers G and H of 2500, and molar ratio of Polyethers G and H to Polyether Id of 1.75 where Polyether Id is based upon an allyl started polyether with a molecular weight of 191 which has been acetoxy endcapped to an efficiency of 77.2%.

Terpolymer 23 represents a composition with blend average molecular weight of Polyethers G and H of 2700, and a molar ratio of Polyethers G and H to Polyether Ie of 1.75 where Polyether Ie is the same as Polyether Id, described above.

Amounts used in the preparations of terpolymers 19–23 were a=4.5 grams, b=3.7 grams, c=3.0 grams, d=4.1 grams and e=3.8 grams.

EXAMPLES 24–30

The following silicone polyether terpolymers were prepared according to the procedure outlined in Example 1.

TABLE VI

| Surf. | Polyhydridosiloxane | R″ Polyether G | R′ Polyether H | R‴ Polyether D |
|---|---|---|---|---|
| 24 | $MD_{76}D'_9M$ - 19.82 g | 26.57 g | 47.03 g | 6.59 g |
| 25 | $MD_{76}D'_9M$ - 20.35 g | 26.13 g | 46.24 g | 7.29 g |
| 26 | $MD_{76}D'_9M$ - 21.02 g | 25.57 g | 45.26 g | 8.15 g |
| 27 | $MD_{76}D'_9M$ - 17.66 g | 19.07 g | 57.41 g | 5.87 g |
| 28 | $MD_{76}D'_9M$ - 18.81 g | 18.42 g | 55.48 g | 7.30 g |
| 29 | $MD_{76}D'_9M$ - 18.17 g | 18.78 g | 56.55 g | 6.51 g |
| 30 | $MD_{76}D'_9M$ - 23.13 g | 35.47 g | 33.13 g | 8.28 g |

The terpolymers described above (24–30) have been prepared in 30 weight percent toluene. The terpolymers of this example cover a blend average molecular weight range for Polyethers G and H of 2150–2750 and a molar ratio of polyethers G and H to Polyether I of 1.4–1.8.

EXAMPLES 31–35

The following terpolymers were prepared according to the method described in Example 1.

TABLE VII

| Surf. | Polyhydridosiloxane | R″ Polyether J | R′ Polyether K | R‴ Polyether D |
|---|---|---|---|---|
| 31 | $MD_{76}D'_9M$ - 21.7 g | 25.2 g | 45.1 g | 8.1 g |
| 32 | $MD_{76}D'_9M$ - 22.5 g | 24.6 g | 43.9 g | 9.1 g |
| 33 | $MD_{76}D'_9M$ - 20.7 g | 18.7 g | 52.3 g | 8.4 g |
| 34 | $MD_{76}D'_9M$ - 19.9 g | 19.1 g | 53.6 g | 7.4 g |
| 35 | $MD_{76}D'_9M$ - 21.1 g | 21.8 g | 48.9 g | 8.2 9 |

Polyether J is an allyl started, acetoxy endcapped polyoxyalkylene polymer with an average molecular weight of about 1578 and containing about 40 weight percent oxyethylene groups and about 60 weight percent oxypropylene groups (R″).

Polyether K is an allyl started, acetoxy endcapped polyoxyalkylene polymer with an average molecular weight of about 4300 and containing about 40 weight percent oxyethylene groups and about 60 weight percent oxypropylene groups (R′).

Terpolymers 31–35 represent compositions where the blend average molecular weight of Polyethers J and K together are 2600–2900 and the molar ratio of Polyethers J and K to Polyether I is 1.3–1.4.

EXAMPLE 36

The following terpolymer was prepared according to the following procedure.

In a 250 mL three necked flask fitted with a heating mantle, mechanical stirrer, thermometer, Dean-Stark trap, Friedrich condenser and nitrogen sparge tube were combined 24.6 grams of R″, an allyl started, acetoxy endcapped polyoxyalkylene polymer with an average molecular weight of about 1578 and containing about 40 weight percent oxyethylene groups and about 60 weight percent oxypropylene groups (designated herein as Polyether L), 43.9 grams of R′, an allyl started, acetoxy endcapped polyoxyalkylene polymer with an average molecular weight of about 4300 and containing about 40 weight percent oxyethylene groups and about 60 weight percent oxypropylene groups (designated herein as Polyether M), 9.1 grams of R''', an allyl started, acetoxy endcapped polyoxypropylene ether with an average molecular weight of about 424 (designated herein as Polyether I) and 42.8 grams of isopropanol. Then, 22.5 grams of a polyhydridosiloxane polymer having the average formula $MD_{76}D'_9M$ (Calculated: 31.82 $ccH_2$/gram; Analyzed: 31.4 $ccH_2$/gram) was added to the pot. This mixture was heated to 75° C. and 0.36 mL of an $H_2PtCl_6$/ethanol solution (10 mg Pt/mL) was added, corresponding to 25 ppm Pt. After an induction period of 7 seconds, an exotherm of 9° C. was generated and a clear time of 71 seconds was noted. After holding the pot contents at 75° C. for one hour, 1 wt.% $NaHCO_3$ was added followed by a nitrogen sparge assisted solvent strip. After completion of the strip, the pot contents were pressure filtered and the product collected. This product, designated herein as Surfactant 36, was a clear, amber colored liquid.

EXAMPLES 37-38

The next two terpolymers were prepared following the procedures outlined in Example 36.

TABLE VIII

| Surf. | Polyhydridosiloxane | R'' Polyether L | R' Polyether M | R''' Polyether D |
|---|---|---|---|---|
| 37 | $MD_{76}D'_9M$ - 19.9 g | 19.1 g | 53.6 g | 7.4 g |
| 38 | $MD_{76}D'_9M$ - 21.1 g | 21.8 g | 48.9 g | 8.2 g |

Terpolymers 36 through 38 represent compositions where the blend average molecular weight of Polyethers L and M range from 2600-2900 and the molar ratio of Polyethers L and M to Polyether I ranges from 1.3 to 1.5. Polyethers L and M are described in Example 35.

EXAMPLE 39

The next terpolymer was made according to the following procedure.

In a 250 mL three necked flask fitted with a heating mantle, mechanical stirrer, thermometer, Dean-Stark trap, Friedrich condenser and nitrogen sparge tube were combined 24.5 grams of R'', an allyl started, acetoxy endcapped polyoxyalkylene polymer with an average molecular weight of about 1560 and containing about 40 weight percent oxyethylene groups and about 60 weight percent oxypropylene groups (designated herein as Polyether N), 50.0 grams of R', an allyl started, acetoxy endcapped polyoxyalkylene polymer with an average molecular weight of about 4300 and containing about 40 weight percent oxyethylene groups and about 60 weight percent oxypropylene groups (designated herein as Polyether M), 4.3 grams of R''', an allyl started, acetoxy endcapped polyoxypropylene ether with an average molecular weight of about 233 (designated herein as Polyether O) and 24.9 grams of isopropanol. These polyether charges represent a blend average molecular weight of 2650 of Polyethers N and M and a molar ratio of Polyethers N and M to Polyether O of 1.75. Then, 21.3 grams of a polyhydridosiloxane polymer having the average formula $MD_{76}D'_9M$ (Calculated: 31.82 $ccH_2$/gram; Analyzed: 31.4 $ccH_2$/gram) was added to the pot. This mixture was heated to 65° C. and 0.36 mL of an $H_2PtCl_6$/ethanol solution (10 mg Pt/mL) was added, corresponding to 25 ppm Pt. After an induction period of 59 seconds, an exotherm of 10° C. was generated and a clear time of 559 seconds was noted. After holding the pot contents at 65° C. for one hour, 1 wt. % $NaHCO_3$ was added followed by a a nitrogen sparge assisted solvent strip. After completion of the strip, the pot contents were pressure filtered and the product collected. This product, designated herein as Surfactant 39, was a clear, amber colored liquid.

EXAMPLES 40-42

The following three terpolymers were preprared according to the procedure of Example 36.

TABLE IX

| Surf. | Polyhydridosiloxane | R'' Polyether N | R' Polyether M | R''' Polyether O |
|---|---|---|---|---|
| 40 | $MD_{76}D'_9M$ - 23.2 g | 33.4 g | 39.3 g | 4.1 g |
| 41 | $MD_{76}D'_9M$ - 22.4 g | 29.2 g | 44.4 g | 4.1 g |
| 42 | $MD_{76}D'_9M$ - 21.6 g | 25.4 g | 48.9 g | 4.1 g |

Polyethers M, N and O are described in Example 38.
Terpolymers 40-42 represent compositions where the blend average molecular weight of Polyethers N and M range from 2350-2650 and the molar ratio of Polyethers N and M to Polyether O ranges from 1.65-1.85.

EXAMPLE 43

The following terpolymer was prepared according to the procedures outlined below.

In a 250 mL three necked flask fitted with a heating mantle, mechanical stirrer, thermometer, Dean-Stark trap, Friedrich condenser and nitrogen sparge tube were combined 24.5 grams of R'', an allyl started, acetoxy endcapped polyoxyalkylene polymer with an average molecular weight of about 1560 and containing about 40 weight percent oxyethylene groups and about 60 weight percent oxypropylene groups (designated herein as Polyether N), 50.0 grams of R', an allyl started, acetoxy endcapped polyoxyalkylene polymer with an average molecular weight of about 4300 and containing about 40 weight percent oxyethylene groups and about 60 weight percent oxypropylene groups (desginated herein as Polyether M), 4.3 grams of R''', an allyl started, acetoxy endcapped polyoxypropylene ether with an average molecular weight of about 233 (designated herein as Polyether O) and 17.6 grams of dipropylene glycol. These polyether charges represent a blend average molecular weight of 2650 of Polyethers N and M and a molar ratio of Polyethers N and M and a molar ratio of Polyethers N and M to Polyether O of 1.75. Then, 21.3 grams of a polyhydridosiloxane polymer having the average formula $MD_{76}D'_9M$ (Calculated: 31.82 $ccH_2$/gram; Analyzed: 31.4 $ccH_2$/gram was added to the pot. This mixture was heated to 65° C. and 0.36 mL of an $H_2PtCl_6$/ethanol solution (10 mg Pt/mL) was added, corresponding to 25 ppm Pt. After an induction period of 42 seconds, an exotherm of 8° C. was generated and a clear time of 370 seconds was noted. After holding the pot contents at 65° C. for one hour, 1 wt. % NaHCO$_3$ was added followed by a filtration at 40 psi to remove solids. This product, designated herein as Surfactant 43, was a clear, amber colored liquid.

EXAMPLES 44–47

The following terpolymers were prepared according to the procedure outlined in Example 43.

TABLE X

| Surf. | Polyhydridosiloxane | R" Polyether N | R' Polyether M | R''' Polyether O |
|---|---|---|---|---|
| 44 | MD$_{76}$D'$_9$M - 22.4 g | 28.0 g | 45.2 g | 4.5 g |
| 45 | MD$_{76}$D'$_9$M - 21.8 g | 24.2 g | 49.4 g | 4.6 g |
| 46 | MD$_{76}$D'$_9$M - 20.9 g | 24.7 g | 50.5 g | 4.0 g |
| 47 | MD$_{76}$D'$_9$M - 20.4 g | 21.3 g | 54.3 g | 4.1 g |

The terpolymers 43–47 represent compositions where the blend average molecular weight of Polyethers N and M ranges from 2500–2800 and the molar ratio of Polyethers N and M to Polyether O ranges from 1.6–1.9.

EXAMPLE 48

In a 250 mL three necked flask fitted with a heating mantle, mechanical stirrer, thermometer, Dean-Stark trap, FriedZrich condenser and nitrogen sparge tube were combined 33.3 grams of R", an allyl started, acetoxy endcapped polyoxyalkylene polymer with an average molecular weight of about 1578 and containing about 40 weight percent oxyethylene groups and about 60 weight percent oxypropylene groups (designated herein as Polyether L), 39.2 grams of R', an allyl started, acetoxy endcapped polyoxyalkylene polymer with an average molecular weight of about 4300 and containing about 40 weight percent oxethylene groups and about 60 weight percent oxypropylene groups (designated herein as Polyether M), 4.5 grams of R''', an allyl started, acetoxy encapped polyoxypropylene ether with an average molecular weight of about 233 (designated herein as Polyether C) and 42.8 grams of dipropylene glycol. These polyether charges represent a blend average molecular weight of 2350 of Polyethers N and M and a molar ratio of Polyethers N and M to Polyether O of 1.85. Then, 23.1 grams of a polyhydridosiloxane polymer having the average formula

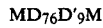

(Calculated: 31.82 ccH$_2$/gram; Analyzed: 31.4 ccH$_2$/gram was added to the pot. This mixture was heated to 65° C. and 0.36 mL of an H$_2$PtCl$_6$/ethanol solution (10 mg Pt/mL) was added, corresponding to 25 ppm Pt. After an induction period of 31 seconds, an exotherm of 7° C. was generated and a clear time of 271 seconds was noted. After holding the pot contents at 65° C. for one hour, 1 wt. % NaHCO$_3$ was added followed by a filtration at 40 psi to remove solids. This product, designated herein as Surfactant 48, was a clear, amber colored liquid.

EXAMPLES 49–54

The following terpolymers were prepared according to the procedure outlined in Example 48.

TABLE XI

| Surf. | Polyhydridosiloxane | R" Polyether N | R' Polyether M | R''' Polyether O |
|---|---|---|---|---|
| 49 | MD$_{76}$D'$_g$M - 23.7 g | 32.8 g | 38.6 g | 4.9 g |
| 50 | MD$_{76}$D'$_g$M - 22.3 g | 29.1 g | 44.3 g | 4.5 g |
| 51 | MD$_{76}$D'$_g$M - 22.9 g | 28.6 g | 43.5 g | 5.0 g |
| 52 | MD$_{76}$D'$_g$M - 21.0 g | 25.6 g | 49.4 g | 4.0 g |
| 53 | MD$_{76}$D'$_g$M - 23.1 g | 33.3 g | 39.2 g | 4.5 g |
| 54 | MD$_{76}$D'$_g$M - 21.6 g | 25.3 g | 48.8 g | 4.5 g |

Terpolymers 49–54 represent compositions where the blend average molecular weight of Polyethers N and M ranges from 2350–2650 and the molar ratio of Polyethers N and M to Polyether O ranges from 1.55–1.85.

EXAMPLES 55–64

The following terpolymers were prepared according to the procedure outlined in Example 43.

TABLE XII

| Surf. | Polyhydridosiloxane | R" Polyether N | R' Polyether M | R''' Polyether D |
|---|---|---|---|---|
| 55 | MD$_{76}$D'$_9$M - 21.2 g | 21.0 g | 49.2 g | 8.2 g |
| 56 | MD$_{76}$D'$_9$M - 19.4 g | 18.7 g | 55.3 g | 6.7 g |
| 57 | MD$_{76}$D'$_9$M - 19.1 g | 16.8 g | 57.3 g | 6.9 g |
| 58 | MD$_{76}$D'$_9$M - 18.9 g | 16.9 g | 57.8 g | 6.5 g |
| 59 | MD$_{76}$D'$_9$M - 18.6 g | 17.0 g | 58.2 g | 6.2 g |
| 60 | MD$_{76}$D'$_9$M - 18.4 g | 15.2 g | 60.1 g | 6.4 g |
| 61 | MD$_{76}$D'$_9$M - 20.5 g | 21.4 g | 50.7 g | 7.4 g |
| 62 | MD$_{76}$D'$_9$M - 19.1 g | 18.9 g | 55.7 g | 6.4 g |
| 63 | MD$_{76}$D'$_9$M - 18.1 g | 15.3 g | 60.6 g | 6.0 g |
| 64 | MD$_{76}$D'$_9$M - 5.5 g | 0.0 g | 32.6 g | 1.9 g |

Terpolymers 55–64 represent compositions where the blend average molecular weight of the Polyethers N and M range from 2750–4300 and the molar ratio of Polyethers N and M to Polyether O ranges from 1.4–1.8.

EXAMPLES 65–69

The following terpolymers were prepared according to the procedure outlined in Example 43.

TABLE XIII

| Surf. | Polyhydridosiloxane | R" Polyether N | R' Polyether M | R''' Polyether O |
|---|---|---|---|---|
| 65 | MD$_{76}$D'$_9$M - 22.4 g | 28.0 g | 45.2 g | 4.5 g |
| 66 | MD$_{76}$D'$_9$M - 21.8 g | 24.2 g | 49.4 g | 4.6 g |
| 67 | MD$_{76}$D'$_9$M - 21.3 g | 24.5 g | 50.0 g | 4.3 g |
| 68 | MD$_{76}$D'$_9$M - 20.9 g | 24.7 g | 50.5 g | 4.0 g |
| 69 | MD$_{76}$D'$_9$M - 20.4 g | 21.3 g | 54.3 g | 4.1 g |

Terpolymers 65–69 represent compositions where the blend average molecular weight of Polyethers N and M range from 2500–2800 and the molar ratio of Polyethers N and M to Polyether O ranges from 1.6 to 1.9.

EXAMPLES 70–79

The following terpolymers were prepared according to the procedure outlined in Example 43.

TABLE XIV

| Surf. | Polyhydridosiloxane | R" Polyether P | R' Polyether Q | R''' Polyether F |
|---|---|---|---|---|
| 70 | MD$_{76}$D'$_9$M - 19.8 g | 20.2 g | 49.1 g | 11.0 g |
| 71 | MD$_{76}$D'$_9$M - 19.7 g | 17.0 g | 51.4 g | 11.9 g |
| 72 | MD$_{76}$D'$_9$M - 21.9 g | 15.4 g | 46.5 g | 16.2 g |
| 73 | MD$_{76}$D'$_9$M - 19.6 g | 13.3 g | 54.1 g | 13.0 g |
| 74 | MD$_{76}$D'$_9$M - 19.3 g | 12.6 g | 55.2 g | 12.8 g |
| 75 | MD$_{76}$D'$_9$M - 17.3 g | 9.7 g | 62.6 g | 10.4 g |
| 76 | MD$_{76}$D'$_9$M - 19.4 g | 8.9 g | 57.4 g | 14.3 g |

TABLE XIV-continued

| Surf. | Polyhydridosiloxane | R'' Poly-ether P | R' Poly-ether Q | R''' Poly-ether F |
|---|---|---|---|---|
| 77 | MD$_{76}$D'$_9$M - 18.4 g | 13.0 g | 57.6 g | 11.1 g |
| 78 | MD$_{76}$D'$_9$M - 18.2 g | 9.5 g | 60.1 g | 12.1 g |
| 79 | MD$_{76}$D'$_9$M - 18.1 g | 5.4 g | 63.2 g | 13.4 g |

The terpolymers described above in Table XIV represent compositions that cover a range of 2750-3763 for the blend average molecular weight of Polyethers P and Q and a molar ratio range of Polyethers P and Q to Polyether F of from 0.8-1.4.

Polyether P is the same polyether as Polyether N above. Polyether Q is an allyl started, acetoxy endcapped polyoxyalkylene polymer with an average molecular weight of about 4400 and containing about 40 weight percent oxyethylene groups and about 60 weight percent oxypropylene units (R').

EXAMPLES 80-84

The following terpolymers were prepared according to the procedure outlined in Example 43.

TABLE XV

| Surf. | Polyhydridosiloxane | Polyether P | Polyether Q | Polyether C |
|---|---|---|---|---|
| 80 | MD$_{229}$D'$_{27}$M - 21.2 g | 27.5 g | 47.1 g | 4.3 g |
| 81 | MD$_{229}$D'$_{27}$M - 16.9 g | 13.6 g | 66.1 g | 3.4 g |
| 82 | MD$_{152}$D'$_{18}$M - 18.8 g | 19.7 g | 57.6 g | 3.8 g |
| 83 | MD$_{37}$D'$_{4.5}$M - 20.4 g | 24.3 g | 51.1 g | 4.1 g |
| 84 | MD$_{17.5}$D'$_{2.25}$M - 20.4 g | 24.3 g | 51.1 g | 4.1 g |

Terpolymers 80-84 represent compositions where the calculated average molecular weight ranges from 5580-71730. The blend average molecular weight of Polyethers P and Q range from 2350-2950 with a molar ratio of Polyethers P and Q to Polyether C of 1.75 for terpolymers 80-82. The blend average molecular weight of Polyethers P and Q is 2650 and the molar ratio of Polyethers P and Q to Polyether C is 1.75 for terpolymers 83 and 84.

EXAMPLES 85-87

The following terpolymers were prepared according to the procedure outlined in Example 43.

TABLE XVI

| Surf. | Polyhydridosiloxane | R'' Polyether P | R' Polyether Q | R''' Polyether R |
|---|---|---|---|---|
| 85 | MD$_{76}$D'$_9$M - 18.7 g | 13.0 g | 50.4 g | 17.9 g |
| 86 | MD$_{76}$D'$_9$M - 19.7 g | 12.2 g | 47.2 g | 21.0 g |
| 87 | MD$_{76}$D'$_9$M - 17.6 g | 8.1 g | 54.3 g | 19.4 g |

Terpolymers 85-87 represent compositions having a blend average molecular weight of Polyethers P and Q of from 3076-3445 and a molar ratio of Polyethers P and Q to Polyether R of 0.8-1.0. Polyether R is an allyl started, acetoxy endcapped polyoxypropylene polymer with an average molecular weight of approximately 924 (R''').

EXAMPLES 88-93

The following terpolymers were prepared according to the procedure outlined in Example 43.

TABLE XVII

| Surf. | Polyhydridosiloxane | R'' Polyether P | R' Polyether Q | R''' Polyether D |
|---|---|---|---|---|
| 88 | MD$_{76}$D'$_9$M - 20.5 g | 20.8 g | 50.9 g | 8.0 g |
| 89 | MD$_{76}$D'$_9$M - 19.3 g | 18.3 g | 55.2 g | 7.2 g |
| 90 | MD$_{76}$D'$_9$M - 19.3 g | 17.2 g | 56.0 g | 7.5 g |
| 91 | MD$_{76}$D'$_9$M - 20.0 g | 17.9 g | 54.0 g | 8.1 g |
| 92 | MD$_{76}$D'$_9$M - 18.3 g | 14.0 g | 60.6 g | 7.1 g |
| 93 | MD$_{76}$D'$_9$M - 19.2 g | 15.5 g | 57.6 g | 7.8 g |

EXAMPLE 94

In a 250 mL three necked flask fitted with a heating mantle, mechanical stirrer, thermometer, Dean-Stark trap, Friedrich condenser and nitrogen sparge tube were combined 24.3 grams of an allyl started, acetoxy endcapped polyoxyalkylene polymer (R'') with an average molecular weight of about 1560 and containing about 40 weight percent oxyethylene groups and about 60 weight percent oxypropylene groups (designated herein as Polyeter N) 51.0 grams of an allyl started, acetoxy endcapped polyoxyalkylene polymer (R') with an average molecular weight of about 4400 and containing about 40 weight percent oxyethylene groups and about 60 weight percent oxyypropylene groups (designated herein as Polyether Q) and 4.1 grams of an allyl started, acetoxy endcapped polyoxypropylene ether (R''') with an average molecular weight of about 233 (designated herein as Polymer C). No solvent was added. The, 20.6 grams of a polhydridosiloxane polymer having the average formula

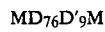

MD$_{76}$D'$_9$M (Calculated: 31.82 ccH$_2$/gram; Analyzed: 31.4 cch$_2$/gram) was added to the pot. This mixture was heated to 85° C. and 0.36 mL of an H$_2$PtCl$_6$/ethanol solution (10 mg Pt/mL) was added, corresponding to 22 ppm Pt. After holding the pot contents at 85° C. for one hour, 1 wt. % NaHCO$_3$ was added followed by a nitrogen sparge assisted solvent strip. After completion of the strip, the pot contents were pressure filtered and the product collected. This product, designated herein as Surfactatn 94, was a clear, amber colored liquid.

EXAMPLE 95

The surfactants described above in Examples 1-94 (excluding 19-23) were evaluated in the polyurethane foam formulation shown below.

| FORMULATION | |
|---|---|
| Material | pphp* (wt.) |
| Polyol I | 100.0 |
| Distilled Water | 5.5 |
| Bis-(2-dimethylamino)ether | 0.02 |
| Triethylene Diamine | 0.02 |
| Dimethylaminoethoxyethanol (DMEE) | 0.06 |
| Dipropylene Glycol | 0.10 |
| Methylene Chloride | 10.0 |
| Stannous Octoate | 0.23 |
| TDI 80/20 (112 Index) | 69.44 |
| Polysiloxane-polyoxyalkylene Terpolymer | VARIED |
| Test I | 1.50 |
| Test II | 1.25 |
| Test III | 1.00 |
| Test IV | 0.85 |
| Test V | 0.75 |
| Test VI | 0.50 |

-continued

| FORMULATION | |
|---|---|
| Material | pphp* (wt.) |
| Test VII | 0.45 |

*parts per hundred parts polyol.

Polyol I is a polyol produced from glycerol and a mixture 84 weight percent propylene oxide and 16 weight percent ethylene oxide. Polyol I has a hydroxyl number of 56.

TDI 80/20 (112 Index) is a mixture of 80 weight percent 2.4 tolylene diisocyanate and 20 weight percent 2,6-tolylene diisocyanate.

The results of the said foam evaluations of the above surfactants are reported in Table XVIII below. These results demonstrate the superior performance of the novel polysiloxane-polyoxyalkylene compositions of this invention over a range of concentrations.

TABLE XVIII

| Product of Example | Foam Test | Height in Rise (in) | Airflow Rate |
|---|---|---|---|
| 1 | II | 37.0 | 4.5 |
| 1 | III | 36.3 | 5.2 |
| 1 | V | 36.3 | 5.5 |
| 1 | VI | 33.6 | 6.0 |
| 2 | II | 37.2 | 5.3 |
| 2 | III | 35.9 | 5.5 |
| 2 | V | 34.9 | 5.7 |
| 2 | VI | 32.7 | 5.5 |
| 3 | II | 36.0 | 6.2 |
| 3 | III | 35.0 | 6.5 |
| 3 | V | 33.3 | 6.9 |
| 3 | VI | 33.3 | 7.0 |
| 4 | II | 36.7 | 5.5 |
| 4 | III | 36.5 | 6.0 |
| 4 | V | 35.4 | 7.0 |
| 4 | VI | 34.5 | 7.3 |
| 5 | II | 36.7 | 5.8 |
| 5 | III | 35.6 | 5.6 |
| 5 | V | 35.7 | 6.0 |
| 5 | VI | 31.2 | 5.9 |
| 6 | II | 35.8 | 7.5 |
| 6 | III | 35.7 | 7.8 |
| 6 | V | 33.9 | 7.4 |
| 6 | VI | 30.6 | 7.0 |
| 7 | II | 34.0 | 5.7 |
| 7 | III | 33.1 | 5.5 |
| 7 | V | 32.9 | 5.4 |
| 7 | VI | 26.5 | voids |
| 8 | II | 36.1 | 5.8 |
| 8 | III | 35.9 | 5.9 |
| 8 | V | 34.6 | 5.6 |
| 8 | VI | 33.9 | 5.5 |
| 9 | II | 36.0 | 5.5 |
| 9 | III | 35.1 | 5.5 |
| 9 | V | 34.2 | 4.5 |
| 9 | VI | 30.5 | 4.6 |
| 10 | II | 34.2 | 5.5 |
| 10 | III | 34.1 | 6.0 |
| 10 | V | 31.9 | 5.4 |
| 10 | VI | 29.8 | voids |
| 11 | II | 32.5 | 5.1 |
| 11 | III | 31.6 | 5.2 |
| 11 | V | 27.7 | voids |
| 11 | VI | COLLAPSE | |
| 12 | II | 35.4 | 4.5 |
| 12 | III | 35.3 | 4.5 |
| 12 | V | 32.9 | 4.0 |
| 12 | VI | 30.6 | voids |
| 13 | II | 35.3 | 5.0 |
| 13 | III | 34.8 | 4.8 |
| 13 | V | 33.3 | 4.8 |
| 13 | VI | 29.7 | voids |
| 14 | II | 31.5 | 5.2 |
| 14 | III | 29.8 | 5.0 |
| 14 | V | 27.7 | voids |
| 14 | VI | COLLAPSE | |

TABLE XVIII-continued

| Product of Example | Foam Test | Height in Rise (in) | Airflow Rate |
|---|---|---|---|
| 15 | II | 32.0 | 5.5 |
| 15 | III | 30.0 | 6.8 |
| 15 | V | 29.5 | 7.4 |
| 15 | VI | 25.2 | voids |
| 16 | II | 33.3 | 6.8 |
| 16 | III | 33.5 | 7.5 |
| 16 | V | 31.1 | 4.0 |
| 16 | VI | 28.4 | voids |
| 17 | II | 34.0 | 5.6 |
| 17 | III | 33.5 | 5.8 |
| 17 | V | 32.5 | 5.9 |
| 17 | VI | 30.9 | 5.4 |
| 18 | II | 35.3 | 6.0 |
| 18 | III | 35.2 | 5.7 |
| 18 | V | 33.4 | 6.0 |
| 18 | VI | 30.6 | 3.6 |
| 24 | II | 36.6 | 6.4 |
| 24 | III | 36.3 | 6.8 |
| 24 | V | 35.0 | 6.9 |
| 24 | VI | 32.3 | 6.5 |
| 25 | II | 34.3 | 5.5 |
| 25 | III | 32.3 | 5.4 |
| 25 | V | 30.1 | 7.3 |
| 25 | VI | 22.9 | voids |
| 26 | II | 34.5 | 7.0 |
| 26 | III | 34.2 | 7.2 |
| 26 | V | 31.7 | 7.3 |
| 26 | VI | 29.6 | 7.3 |
| 27 | II | 36.9 | 5.0 |
| 27 | III | 35.7 | 5.6 |
| 27 | V | 33.8 | 5.5 |
| 27 | VI | 31.1 | 5.0 |
| 28 | II | 36.5 | 7.0 |
| 28 | III | 35.3 | 7.2 |
| 28 | V | 34.8 | 7.5 |
| 28 | VI | 33.9 | 7.5 |
| 29 | II | 36.8 | 5.0 |
| 29 | III | 37.0 | 5.5 |
| 29 | V | 35.5 | 6.1 |
| 29 | VI | 33.4 | 6.5 |
| 30 | II | 32.7 | 6.0 |
| 30 | III | 31.2 | 7.0 |
| 30 | V | 29.4 | 7.0 |
| 30 | VI | 26.2 | voids |
| 31 | II | 36.5 | 6.9 |
| 31 | III | 36.2 | 7.0 |
| 31 | VI | 33.0 | 7.0 |
| 32 | II | 35.7 | 7.6 |
| 32 | III | 36.0 | 8.2 |
| 32 | VI | 34.0 | 8.4 |
| 33 | II | 36.7 | 7.2 |
| 33 | III | 36.7 | 7.4 |
| 33 | VI | 33.2 | 7.1 |
| 34 | II | 37.0 | 5.8 |
| 34 | III | 37.7 | 6.5 |
| 34 | VI | 33.9 | 6.5 |
| 35 | II | 36.9 | 7.0 |
| 35 | III | 36.9 | 7.4 |
| 35 | VI | 32.0 | 6.5 |
| 36 | II | 36.5 | 8.0 |
| 36 | III | 36.0 | 8.4 |
| 36 | VI | 35.4 | 8.5 |
| 37 | II | 37.4 | 5.6 |
| 37 | III | 37.3 | 6.5 |
| 37 | VI | 33.9 | 6.7 |
| 38 | II | 37.0 | 6.5 |
| 38 | III | 37.0 | 7.3 |
| 38 | VI | 34.5 | 8.0 |
| 39 | II | 37.5 | 5.5 |
| 39 | IV | 36.8 | 6.5 |
| 39 | VII | 33.9 | 7.0 |
| 40 | II | 37.1 | 5.4 |
| 40 | V | 36.4 | 7.5 |
| 40 | VI | 35.1 | 9.0 |
| 41 | II | 37.4 | 5.0 |
| 41 | V | 37.1 | 7.0 |
| 41 | VI | 35.5 | 8.9 |
| 42 | II | 38.2 | 5.1 |
| 42 | V | 36.4 | 7.0 |
| 42 | VI | 35.2 | 8.5 |

TABLE XVIII-continued

| Product of Example | Foam Test | Height in Rise (in) | Airflow Rate |
|---|---|---|---|
| 43 | II | 37.8 | 4.0 |
| 43 | IV | 37.2 | 5.0 |
| 43 | VII | 34.9 | 6.5 |
| 44 | II | 37.3 | 4.5 |
| 44 | IV | 37.3 | 6.2 |
| 44 | VII | 34.6 | 7.6 |
| 45 | II | 37.9 | 3.9 |
| 45 | IV | 37.7 | 5.5 |
| 45 | VII | 35.2 | 7.1 |
| 46 | II | 37.4 | 5.0 |
| 46 | IV | 37.4 | 5.5 |
| 46 | VII | 34.4 | 6.0 |
| 47 | II | 37.9 | 4.3 |
| 47 | IV | 37.5 | 5.0 |
| 47 | VII | 34.9 | 5.6 |
| 48 | II | 36.2 | 4.6 |
| 48 | IV | 35.9 | 5.5 |
| 48 | VII | 32.6 | 6.9 |
| 49 | II | 35.2 | 8.0 |
| 49 | IV | 35.0 | 8.1 |
| 49 | VII | 32.9 | 8.5 |
| 50 | II | 35.6 | 5.3 |
| 50 | IV | 36.0 | 6.0 |
| 50 | VII | 33.1 | 7.5 |
| 51 | II | 36.2 | 5.0 |
| 51 | IV | 34.6 | 5.5 |
| 51 | VII | 33.8 | 6.2 |
| 52 | II | 37.4 | 5.3 |
| 52 | IV | 37.1 | 5.9 |
| 52 | VII | 34.4 | 5.8 |
| 53 | II | 36.3 | 6.9 |
| 53 | IV | 35.2 | 6.0 |
| 53 | VII | 33.6 | 5.8 |
| 54 | II | 37.3 | 5.5 |
| 54 | IV | 36.8 | 5.8 |
| 54 | VII | 35.0 | 6.6 |
| 55 | II | 37.1 | 7.0 |
| 55 | IV | 36.5 | 7.5 |
| 55 | VII | 35.1 | 8.8 |
| 56 | II | 38.2 | 4.8 |
| 56 | IV | 37.4 | 5.0 |
| 56 | VII | 34.9 | 6.5 |
| 57 | II | 38.2 | 4.5 |
| 57 | IV | 37.4 | 6.0 |
| 57 | VII | 35.9 | 6.6 |
| 58 | II | 38.6 | 3.4 |
| 58 | IV | 38.1 | 3.5 |
| 58 | VII | 36.8 | 3.5 |
| 59 | II | 38.8 | 4.0 |
| 59 | IV | 37.6 | 4.0 |
| 59 | VII | 35.9 | 5.0 |
| 60 | II | 38.7 | 3.8 |
| 60 | IV | 37.6 | 3.8 |
| 60 | VII | 35.0 | 3.7 |
| 61 | II | 37.7 | 5.0 |
| 61 | IV | 36.7 | 5.9 |
| 61 | VII | 35.0 | 7.6 |
| 62 | II | 38.8 | 3.8 |
| 62 | IV | 37.7 | 4.5 |
| 62 | VII | 35.7 | 5.5 |
| 63 | II | 37.9 | 3.0 |
| 63 | IV | 37.9 | 3.8 |
| 63 | VII | 35.6 | 4.0 |
| 64 | II | 37.2 | 3.4 |
| 64 | IV | 36.8 | 3.5 |
| 64 | VII | 33.9 | 2.2 |
| 65 | II | 37.3 | 4.5 |
| 65 | IV | 37.3 | 6.2 |
| 65 | VII | 34.6 | 7.6 |
| 66 | II | 37.9 | 3.9 |
| 66 | IV | 37.7 | 5.5 |
| 66 | VII | 35.2 | 7.1 |
| 67 | II | 37.8 | 4.0 |
| 67 | IV | 37.2 | 5.0 |
| 67 | VII | 34.9 | 6.5 |
| 68 | II | 37.4 | 5.0 |
| 68 | IV | 37.4 | 5.5 |
| 68 | VII | 34.4 | 6.0 |
| 69 | II | 37.9 | 4.3 |
| 69 | IV | 37.5 | 5.0 |
| 69 | VII | 34.9 | 5.6 |
| 70 | I | 36.5 | 5.5 |
| 70 | III | 36.7 | 6.8 |
| 70 | VI | 34.6 | 9.0 |
| 71 | I | 36.7 | 5.4 |
| 71 | III | 36.1 | 6.5 |
| 71 | VI | 34.9 | 8.5 |
| 72 | I | 20.9 | 3.9 |
| 72 | III | 29.1 | 7.0 |
| 72 | VI | 28.3 | 8.1 |
| 73 | I | 36.2 | 7.0 |
| 73 | III | 36.6 | 8.3 |
| 73 | VI | 33.9 | 8.5 |
| 74 | I | 36.7 | 6.3 |
| 74 | III | 36.5 | 7.8 |
| 74 | VI | 34.5 | 8.5 |
| 75 | I | 38.7 | 3.0 |
| 75 | III | 37.4 | 4.0 |
| 75 | VI | 36.3 | 6.6 |
| 76 | I | 36.5 | 7.8 |
| 76 | III | 35.8 | 9.0 |
| 76 | VI | 33.9 | 9.0 |
| 77 | I | 37.2 | 3.7 |
| 77 | III | 37.2 | 5.5 |
| 77 | VI | 36.0 | 7.6 |
| 78 | I | 37.5 | 4.0 |
| 78 | III | 37.4 | 5.8 |
| 78 | VI | 35.7 | 7.5 |
| 79 | I | 37.4 | 5.9 |
| 79 | III | 37.4 | 7.0 |
| 79 | VI | 34.5 | 8.0 |
| 80 | II | 36.2 | 5.5 |
| 80 | IV | 36.4 | 5.4 |
| 80 | VII | 35.6 | 5.8 |
| 81 | II | 36.5 | 1.5 |
| 81 | IV | 36.0 | 2.0 |
| 81 | VII | 35.6 | 1.8 |
| 82 | II | 38.1 | 2.3 |
| 82 | IV | 38.0 | 3.5 |
| 82 | VII | 35.3 | 2.8 |
| 83 | I | 38.0 | 5.2 |
| 83 | III | 36.4 | 5.5 |
| 83 | VI | 35.1 | 7.5 |
| 84 | I | 27.9 | 7.8 |
| 84 | III | 29.0 | 8.0 |
| 84 | VI | 27.4 | voids |
| 85 | I | 37.4 | 3.1 |
| 85 | III | 37.2 | 5.2 |
| 85 | VI | 35.6 | 8.5 |
| 86 | I | 35.7 | 4.6 |
| 86 | III | 35.4 | 7.5 |
| 86 | VI | 33.5 | 9.1 |
| 87 | I | 36.9 | 4.2 |
| 87 | III | 35.7 | 7.5 |
| 87 | VI | 36.0 | 8.1 |
| 88 | I | 36.2 | 6.8 |
| 88 | III | 34.9 | 7.5 |
| 88 | VI | 34.5 | 8.5 |
| 89 | I | 37.4 | 5.5 |
| 89 | III | 36.2 | 5.7 |
| 89 | VI | 36.4 | 7.5 |
| 90 | I | 36.6 | 6.5 |
| 90 | III | 36.4 | 7.5 |
| 90 | VI | 34.8 | 8.4 |
| 91 | I | 36.6 | 5.5 |
| 91 | III | 35.9 | 6.4 |
| 91 | VI | 35.5 | 7.9 |
| 92 | I | 37.3 | 5.4 |
| 92 | III | 36.8 | 4.0 |
| 92 | VI | 35.4 | 6.6 |
| 93 | I | 36.8 | 3.5 |
| 93 | III | 36.3 | 4.1 |
| 93 | VI | 36.5 | 4.8 |
| 94 | I | 38.4 | 3.5 |
| 94 | III | 37.9 | 5.0 |
| 94 | VI | 35.6 | 7.2 |

EXAMPLE 96

The terpolymers described in Examples 19–23 were evaluated in the polyurethane foam formulation shown below.

FORMULATION

| Material | pphp (wt.) |
|---|---|
| Polyol | 100.0 |
| Distilled Water | 5.7 |
| Bis-(2-dimethylamino)ether | 0.01 |
| Triethylene Diamine | 0.01 |
| Dimethylaminoethoxyethanol (DMEE) | 0.03 |
| Dipropylene Glycol | 0.05 |
| Methylene Chloride | 9.0 |
| Stannous Octoate | 0.2 |
| TDI 80/20 (110 Index) | 70.6 |
| Polysiloxane-polyoxyalkylene Terpolymer | VARIED |
| Test I | 1.50 |
| Test II | 1.00 |
| Test III | 0.70 |
| Test IV | 0.60 |
| Test V | 0.42 |

The results of the said foam evaluations of the above surfactants are reported in Table XIX below. These results demonstrate the superiority of the novel polysiloxane-polyoxyalkylene compositions of this invention as compared to a polysiloxane-polyoxyalkylene copolymer surfactant (CNTRL A).

TABLE XIX

| Product of Example | Foam Test | Height in Rise (in) | Airflow Rate |
|---|---|---|---|
| CNTRL A | I | 14.7 | 5.00 |
| CNTRL A | II | 14.0 | 6.00 |
| CNTRL A | V | 12.0 | 5.50 |
| 19 | V | 13.3 | 7.25 |
| 20 | V | 14.5 | 4.50 |
| 21 | V | 14.6 | 1.25 |
| 22 | II | 14.7 | 4.00 |
| 22 | III | 14.5 | 4.75 |
| 22 | VI | 13.7 | 5.50 |
| 23 | II | 14.8 | 4.00 |
| 23 | III | 14.7 | 4.75 |
| 23 | VI | 14.0 | 4.25 |
| [19 + 20] (50/50) | II | 14.8 | 5.50 |
| [19 + 20] (50/50) | (III | 14.7 | 6.00 |
| [19 + 20] (50/50) | VI | 13.4 | 5.50 |

CNTRL A is commercially available as B-8021 from Th. Goldschmïdt A.G. It is a hydrolyzable type surfactant that is not applicable in Flame Retardant formulations.

The following table documents for R' and R'', the calculated molecular weight of R''' (R'''—MW) molar ratios of R' and R' to R'''; (b+c:d), calculated blend average molecular weight (BAMW) and the calculated total blend average molecular weight (TOTAL BAMW) for all of the polyethers for the terpolymers described above (Examples 1–94).

TABLE XX

| Surfactant | R' & R'' BAMW | R'''-MW | (b + c):d | TOTAL BAMW |
|---|---|---|---|---|
| 1 | 2700 | 233 | 1.75 | 1803 |
| 2 | 2600 | 233 | 1.60 | 1690 |
| 3 | 2500 | 233 | 1.45 | 1575 |
| 4 | 2500 | 233 | 1.75 | 1676 |
| 5 | 2700 | 233 | 1.45 | 1693 |
| 6 | 2700 | 424 | 1.50 | 1790 |
| 7 | 2700 | 424 | 1.60 | 1825 |
| 8 | 3000 | 424 | 1.50 | 1970 |
| 9 | 3000 | 424 | 1.60 | 2009 |
| 10 | 2450 | 590 | 1.80 | 1785 |
| 11 | 2450 | 590 | 1.60 | 1735 |
| 12 | 2750 | 590 | 1.80 | 1980 |
| 13 | 2750 | 590 | 1.60 | 1920 |
| 14 | 2300 | 590 | 1.60 | 1640 |
| 15 | 2150 | 590 | 1.60 | 1550 |
| 16 | 2450 | 590 | 1.40 | 1675 |
| 17 | 2750 | 590 | 1.40 | 1850 |
| 18 | 2600 | 590 | 1.60 | 1830 |
| 19 | 2500 | 233 | 1.75 | 1676 |
| 20 | 2500 | 233 | 1.75 | 1676 |
| 21 | 2500 | 233 | 1.75 | 1676 |
| 22 | 2500 | 233 | 1.75 | 1676 |
| 23 | 2700 | 233 | 1.75 | 1803 |
| 24 | 2450 | 424 | 1.80 | 1726 |
| 25 | 2450 | 424 | 1.60 | 1671 |
| 26 | 2450 | 424 | 1.40 | 1606 |
| 27 | 2750 | 424 | 1.80 | 1919 |
| 28 | 2750 | 424 | 1.40 | 1781 |
| 29 | 2750 | 424 | 1.60 | 1855 |
| 30 | 2150 | 424 | 1.60 | 1486 |
| 31 | 2600 | 424 | 1.50 | 1730 |
| 32 | 2600 | 424 | 1.30 | 1654 |
| 33 | 2900 | 424 | 1.30 | 1823 |
| 34 | 2900 | 424 | 1.50 | 1910 |
| 35 | 2750 | 424 | 1.40 | 1781 |
| 36 | 2750 | 424 | 1.30 | 1739 |
| 37 | 2900 | 424 | 1.50 | 1910 |
| 38 | 2600 | 424 | 1.40 | 1693 |
| 39 | 2650 | 233 | 1.75 | 1771 |
| 40 | 2350 | 233 | 1.85 | 1607 |
| 41 | 2500 | 233 | 1.75 | 1676 |
| 42 | 2650 | 233 | 1.65 | 1740 |
| 43 | 2650 | 233 | 1.75 | 1771 |
| 44 | 2500 | 233 | 1.75 | 1665 |
| 45 | 2650 | 233 | 1.60 | 1720 |
| 46 | 2650 | 233 | 1.90 | 1815 |
| 47 | 2800 | 233 | 1.75 | 1865 |
| 48 | 2350 | 233 | 1.85 | 1607 |
| 49 | 2350 | 233 | 1.65 | 1551 |
| 50 | 2500 | 233 | 1.75 | 1676 |
| 51 | 2500 | 233 | 1.55 | 1611 |
| 52 | 2650 | 233 | 1.85 | 1802 |
| 53 | 2350 | 233 | 1.85 | 1607 |
| 54 | 2650 | 233 | 1.65 | 1740 |
| 55 | 2750 | 424 | 1.40 | 1781 |
| 56 | 2900 | 424 | 1.70 | 1983 |
| 57 | 3000 | 424 | 1.60 | 2009 |
| 58 | 3000 | 424 | 1.70 | 2046 |
| 59 | 3000 | 424 | 1.80 | 2080 |
| 60 | 3100 | 421 | 1.70 | 2109 |
| 61 | 2750 | 424 | 1.60 | 1855 |
| 62 | 2900 | 424 | 1.80 | 2016 |
| 63 | 3130 | 424 | 1.80 | 2144 |
| 64 | 4300 | 424 | 1.75 | 2891 |
| 65 | 2500 | 233 | 1.75 | 1675 |
| 66 | 2650 | 233 | 1.60 | 1720 |
| 67 | 2650 | 233 | 1.75 | 1770 |
| 68 | 2650 | 233 | 1.90 | 1815 |
| 69 | 2800 | 233 | 1.75 | 1865 |
| 70 | 2750 | 590 | 1.40 | 1850 |
| 71 | 2900 | 590 | 1.20 | 1850 |
| 72 | 2900 | 590 | 0.80 | 1615 |
| 73 | 3050 | 590 | 1.00 | 1850 |
| 74 | 3163 | 590 | 1.00 | 1880 |
| 75 | 3425 | 590 | 1.20 | 2135 |
| 76 | 3425 | 590 | 0.80 | 1850 |
| 77 | 3175 | 590 | 1.20 | 2000 |
| 78 | 3410 | 590 | 1.00 | 2000 |
| 79 | 3763 | 590 | 0.80 | 2000 |
| 80 | 2350 | 233 | 1.75 | 1580 |
| 81 | 2950 | 233 | 1.75 | 1962 |
| 82 | 2650 | 233 | 1.75 | 1771 |
| 83 | 2650 | 233 | 1.75 | 1771 |
| 84 | 2650 | 233 | 1.75 | 1771 |
| 85 | 3076 | 924 | 1.00 | 2026 |
| 86 | 3076 | 924 | 0.80 | 1903 |
| 87 | 3445 | 924 | 0.80 | 2071 |
| 88 | 2750 | 424 | 1.40 | 1780 |
| 89 | 2900 | 424 | 1.50 | 1910 |

TABLE XX-continued

| Surfactant | R' & R" BAMW | R'''-MW | (b + c):d | TOTAL BAMW |
|---|---|---|---|---|
| 90 | 2950 | 424 | 1.40 | 1898 |
| 91 | 2900 | 424 | 1.30 | 1823 |
| 92 | 3150 | 424 | 1.40 | 2014 |
| 93 | 3050 | 424 | 1.30 | 1908 |
| 94 | 2650 | 233 | 1.75 | 1771 |

EXAMPLE 97

The terpolymers described in Examples 67, 79 and 90 were evaluated in the Flame Retardant polyurethane foam formulations shown below.

| | FORMULATION | | | |
|---|---|---|---|---|
| Material | 96 A pphp | 96 B pphp | 96 C pphp | 96 D pphp* |
| Polyol I | 100.0 | 100.0 | 100.0 | 100.0 |
| Distilled Water | 4.8 | 4.8 | 4.8 | 4.8 |
| Bis-(2-dimethylamino)ether | 0.01 | 0.01 | 0.01 | 0.01 |
| Triethylene Diamine | 0.01 | 0.01 | 0.01 | 0.01 |
| Dimethylaminoethoxyethanol (DMEE) | 0.03 | 0.03 | 0.03 | 0.03 |
| Dipropylene Glycol | 0.05 | 0.05 | 0.05 | 0.05 |
| Methylene Chloride | 5.0 | 5.0 | 5.0 | 5.0 |
| Thermolin-101** | 8.0 | 8.0 | 10.0 | 10.0 |
| Stannous Octoate | 0.23 | 0.23 | 0.23 | 0.23 |
| TDI 80/20 (110 Index) | 60.9 | 60.9 | 60.9 | 60.9 |
| Surfactant | 0.8 | 1.2 | 0.8 | 1.2 |

*parts per hundred parts polyol
**Thermolin-101 is a flame retardant additive available from Olin Chemical Company.

The results of the said foam evaluations of the above surfactants are reported below. These foams were evaluated in California Burn Test 117.

TABLE XXI

| Product of Example | Foam Test | Height of Rise (in) | Airflow (scfm) | Char Length (in) | After Flame (seconds) |
|---|---|---|---|---|---|
| 67 | 96 A | 13.9 | 4.0 | 4.14 | 1.0 |
| 67 | 96 B | 14.0 | 3.0 | 4.38 | 0.4 |
| 67 | 96 C | 13.8 | 4.5 | 4.42 | 0.4 |
| 67 | 96 D | 14.0 | 3.3 | 4.70 | 1.4 |
| 79 | 96 A | 14.0 | 7.0 | 4.50 | 0.8 |
| 79 | 96 B | 14.3 | 6.3 | 4.44 | 0.8 |
| 79 | 96 C | 13.3 | 6.0 | 4.92 | 0.6 |
| 79 | 96 D | 13.7 | 5.5 | 3.18 | 0.0 |
| 90 | 96 A | 13.8 | 7.5 | 5.54 | 0.6 |
| 90 | 96 B | 13.9 | 6.3 | 4.70 | 0.4 |
| 90 | 96 C | 13.3 | 7.0 | 3.42 | 0.0 |
| 90 | 96 D | 13.8 | 6.5 | 5.22 | 1.0 |

All of the above surfactants passed the burn test. These tests are for evaluation purposes and are conducted under controlled conditions. The results are not intended as a warranty of how foams will burn under actual fire conditions.

That which is claimed is:

1. A polysiloxane-polyoxyalkylene composition of the nominal formula:

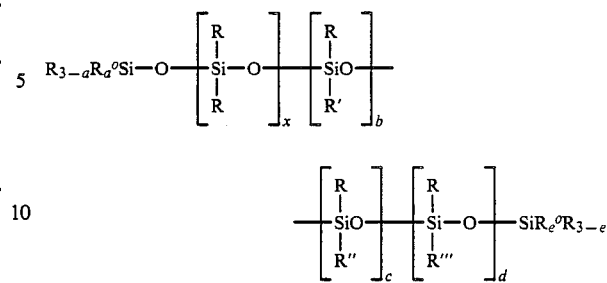

wherein:

R is an alkyl group having 1 to 3 carbon atoms;

R' is a poly-(oxyethylen-oxypropylene) ether group which contains 20% to 60% oxyethylene by weight and which has an average molecular weight of from about 3,000 to about 5,500 and which is attached to the silicon atom through a difunctional link;

R" is a poly-(oxyethylene-oxypropylene) ether group which contains 20% to 60% oxyethylene by weight and which has an average molecular weight of from about 800 to about 2,900 and which is attached to the silicon atom through a difunctional link; and R''' is a polyoxypropylene polyether group which has an average molecular weight from about 130 to about 1200 and which is attached to the silicon atom through a difunctional link;

$R^o$ is R', R" or R''';

a and e are individually 0 or 1;

either b is not equal to zero and/or c is not equal to zero;

x, b, c and d are positive numbers such that the sum of x+b+c+d ranges from 25 to 400;

and x is greater than the sum b+c+d; wherein the ratio (b+c):d is from 0.8 to 1.9.

2. The composition of claim 1 wherein the polyoxyalkylene polyethers terminate with an alkoxy group having 1 to 4 carbon atoms or an acyloxy group of a lower aliphatic carboxylic acid.

3. The composition of claim 2 wherein the terminal group is acetoxy.

4. The composition of claim 1 wherein R is methyl.

5. The composition of claim 1 wherein the sum of x+b+c+d from 35 to 400.

6. The composition of claim 1 wherein the sum of x+b+c+d is from 40 to 260.

7. The composition of claim 1 wherein said difunctional link is represented by the formula $-\{C_nH_{2n}\}-O-$, wherein n is a number from 0 to 6.

8. The composition of claim 7 wherein n is a number from 0 to 4.

9. The composition of claim 8 wherein n is 3 or 4.

10. The composition of claim 1 wherein the numerical ratio of x:b+c+d is from about 3:1 to about 15:1.

11. The composition of claim 1 wherein the polyoxypropylene polyether of R''' comprises a polyoxypropylene polyether with a hydroxyl group attached to the terminal carbon of the polyoxypropylene polyether.

* * * * *